UNITED STATES PATENT OFFICE.

CHRISTIAN RUDOLPH, OF OFFENBACH, NEAR FRANKFORT-ON-THE-MAIN, GERMANY, ASSIGNOR TO K. OEHLER, OF SAME PLACE.

PRODUCTION OF YELLOW COLORING-MATTER.

SPECIFICATION forming part of Letters Patent No. 382,832, dated May 15, 1888.

Application filed September 27, 1887. Serial No. 250,851. (No specimens.)

*To all whom it may concern:*

Be it known that I, CHRISTIAN RUDOLPH, a subject of the Emperor of Germany, residing at Offenbach, near Frankfort-on-the-Main, in the Grand Duchy of Hesse, in the Empire of Germany, have invented a new and useful Improvement in Yellow Dye-Stuffs, of which the following is a specification.

The starting-points for the production of my new dye-stuffs are benzaldehyde and the so-called "aromatic metadiamines" of the general formula $CxH_2x-8(NH_2)2$. With these materials I first produce a series of intermediate compounds, which are then converted into the new dye-stuff.

The first intermediate compound which I use for my purposes is produced by combining one molecule of a metadiamine and one molecule of benzaldehyde. One molecule of water is expelled and the compound obtained answers the general formula $$CxH_2x-8NH_2,NCHC_6H_5.$$

When this compound is allowed to act upon a watery or alcoholic solution of a salt of the before-named metadiamines, the second intermediate compound will be obtained. These new bases are called "tetra-amines," the formula of which is $C_6H_5CH[CxH_2x-9(NH_2)2]2$. Besides the way just indicated, there are still two other ways of producing these tetra-amines: one, by allowing one molecule of metadiamine and one molecule of a salt of it; or, two, by the action of one molecule of benzaldehyde upon two molecules of a salt of a metadiamine. All these ways will be closely described later on in the example for the production of benzoflavine from metatoluylendiamin.

The third step of the process of producing yellow dye-stuffs from benzaldehyde and aromatic metadiamines consists in the conversion of the before-named tetra-amines into bases of the type of hydroacridines

The conversion is carried out by treating with diluted acids or other means capable of separating ammonia. During this operation the tetra-amines lose one molecule of ammonia.

The last step in the way of manufacturing the yellow dye-stuffs consists in oxidizing the hydroacridines obtained and separating two atoms of hydrogen, thus transforming them into acridines of the composition expressed by the formula

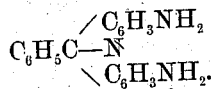

As example of my way of proceeding, I describe the production of a benzoflavine from metatoluylendiamine.

I.—*Production of the first intermediate compound, called "monobenzyliden-metatoluylendiamine."*

Twelve pounds of metatoluylendiamine and water are mixed to a paste and 10.6 pounds of benzaldehyde added. The mass evolves heat and separates the new compound as a half-liquid resin, which becomes hard after some time. It is then pulverized and washed and dried.

II.—*Production of the second intermediate compound, tetra amidoditolylphenylmethan.*

(*a.*) Seventy-five pounds of monobenzyliden-metatoluylendiamine and eighty-five pounds of sulphate of metatoluylendiamine are heated together up to 60 to 70° centigrade in five hundred pounds of water until the whole is dissolved. Then dilute with more water and precipitate the leuco base formed by adding alkalies.

(*b.*) Mix forty-eight pounds of sulphate of metatoluylendiamine with twenty pounds of caustic lye of forty per cent. and thirty pounds of water. To this paste add 10.6 pounds of benzaldehyde dissolved in twenty-four pounds of alcohol of 95° Twaddle, and heat the whole to 60° centigrade as long as necessary to dissolve all the ingredients. The solution is then diluted with water, and the base formed is precipitated with soda or caustic lye, washed, pressed, and dried.

(*c.*) Sixty-one pounds of metatoluylendiamine and ninety-eight pounds of its hydrochlorate are dissolved in two hundred pounds of alcohol, and then fifty-three pounds of benzaldehyde are poured in. The whole mass is heated for some time in the water bath to 70 or 80° centigrade until the precipitation of the muriatic salt of the tetra-amido base, which is difficultly soluble in alcohol, is finished. The mass, which has a pulpy consistency, is allowed to cool, and filtered. The hydrochlorate of the new base formed is washed with alcohol and gathered on a filter. It is a pure substance, if pure materials were used, and has the formula $C_{21}H_{24}N_4, 2HCl$.

(d.) A mixture of one hundred pounds of sulphate of metatoluylendiamine, two hundred pounds alcohol of fifty per cent., and twenty-five pounds of benzaldehyde is heated for several hours in an apparatus with reflux refrigerator. During this operation the salt of the metatoluylendiamine is slowly dissolved and the sulphate of tetra-amidoditolylphenylmethan is separated in the form of a sandy crystalline powder of the following composition: $C_{21}H_{24}N_4, 2H_2SO_4$.

III.—*Production of the third intermediate compound, called "hydrodiamidodimethylphenylacridine."*

(a.) I take one pound of the hydrochlorate of the tetra-amidoditolylphenylmethan and five pounds of muriatic acid of thirteen per cent. and heat them for several hours in an autoclave up to 160°. After cooling, one finds in the autoclave a fast cake of fine needles of the hydrochlorate of hydrodiamidodimethylphenylacridine, which can be used for the production of the dye-stuff without further purification. It has the formula $C_{21}H_{21}N_3, 2HCl$.

(b.) One hundred pounds sulphate of tetra-amidoditolylphenylmethan are dissolved in three hundred and sixty pounds of muriatic acid of 16.5 per cent. and heated for several hours in an autoclave. The hydro base thus formed is the same as that produced by the method of example a. Instead of muriatic acid, one may use sulphuric acid, phosphoric acid, chloride of zinc, &c., to obtain the same result.

IV.—*Production of the dye stuff called "benzoflavine."*

The hydrodiamidodimethylphenylacridine is easily oxidized by the oxygen of the air, and the dye-stuff diamidodimethylphenylacridine is formed. This occurs already when it is tried to crystallize the salts of the hydro base. It would therefore be sufficient to blow air into the solution of the hydro base; but one obtains better results by using other slowly-acting oxidizing bodies—such as, for example, chloride of iron.

I proceed by mixing a diluted hydrochloric solution of one hundred pounds of hydro base containing some chloride of zinc with a thirty per cent. solution of three hundred and fifty pounds of chloride of iron. The dye-stuff immediately falls out as a compound with chloride of zinc. It is a voluminous yellow precipitate which is filtered off, pressed, and dried. For the purpose of dyeing and printing, not only the double salt of hydrochlorate of diamidodimethylphenylacridine with chloride of zinc can be used, but also the single salts of diamidodimethylphenylacridine themselves.

Instead of metatoluylendiamin, one may also use metaphenylendiamin for the production of benzoflavine, and the process as well as the final product will be all the same as above described.

The benzoflavine is an orange-colored powder which is pretty difficultly soluble in water and somewhat easier in alcohol. The dye-stuff precipitates from its watery solution when diluted muriatic acid is added to it. The solution in alcohol shows a very characteristic intense yellow-greenish fluorescence, which disappears on an addition of diluted acids.

The solution in concentrated sulphuric acid is yellowish with a green fluorescence. When caustic soda is added to a solution of benzoflavine in water, the dye-stuff is transformed into its base, which precipitates in the shape of yellowish-white flakes, being insoluble in water, but soluble in alcohol and ether.

What I claim, and desire to secure by Letters Patent, is—

1. The method of producing a yellow dye-stuff from benzaldehyde and toluylen or phenylen-diamine by first condensing benzaldehyde with the said diamines, as described, next heating the tetra-amines thus formed with bodies capable of separating ammonia, and then converting the products of this reaction (the hydrophenylacridines) by oxidizing agents—such as chloride of iron, &c.—into the new yellow dye-stuff herein described as benzoflavine.

2. The yellow dye-stuff herein described as benzoflavine, consisting of an orange-colored powder difficultly soluble in water, somewhat more easily soluble in alcohol, capable of being precipitated from its watery solution by the addition of muriatic acid, showing in alcoholic solution an intense greenish-yellow fluorescence, which disappears on the addition of diluted acids, showing when in solution in concentrated sulphuric acid a yellow tint with greenish fluorescence, and from an aqueous solution of which the coloring-matter is, by the addition of caustic soda, precipitated in the shape of yellowish-white flakes insoluble in water, but soluble in alcohol and ether, as herein described.

In testimony whereof I have signed my name to this specification in the presence of two subscribing witnesses.

CHRISTIAN RUDOLPH.

Witnesses:
JOSEPH PATRICK,
ALVESTO S. HOGUE.